June 2, 1970     R. F. PASTUSZAK     3,515,310
WORKLOADER OF THE MAGAZINE TYPE

Filed March 20, 1968     4 Sheets-Sheet 1

INVENTOR
RONALD F. PASTUSZAK

BY *Sperry and Zoda*
ATTORNEYS

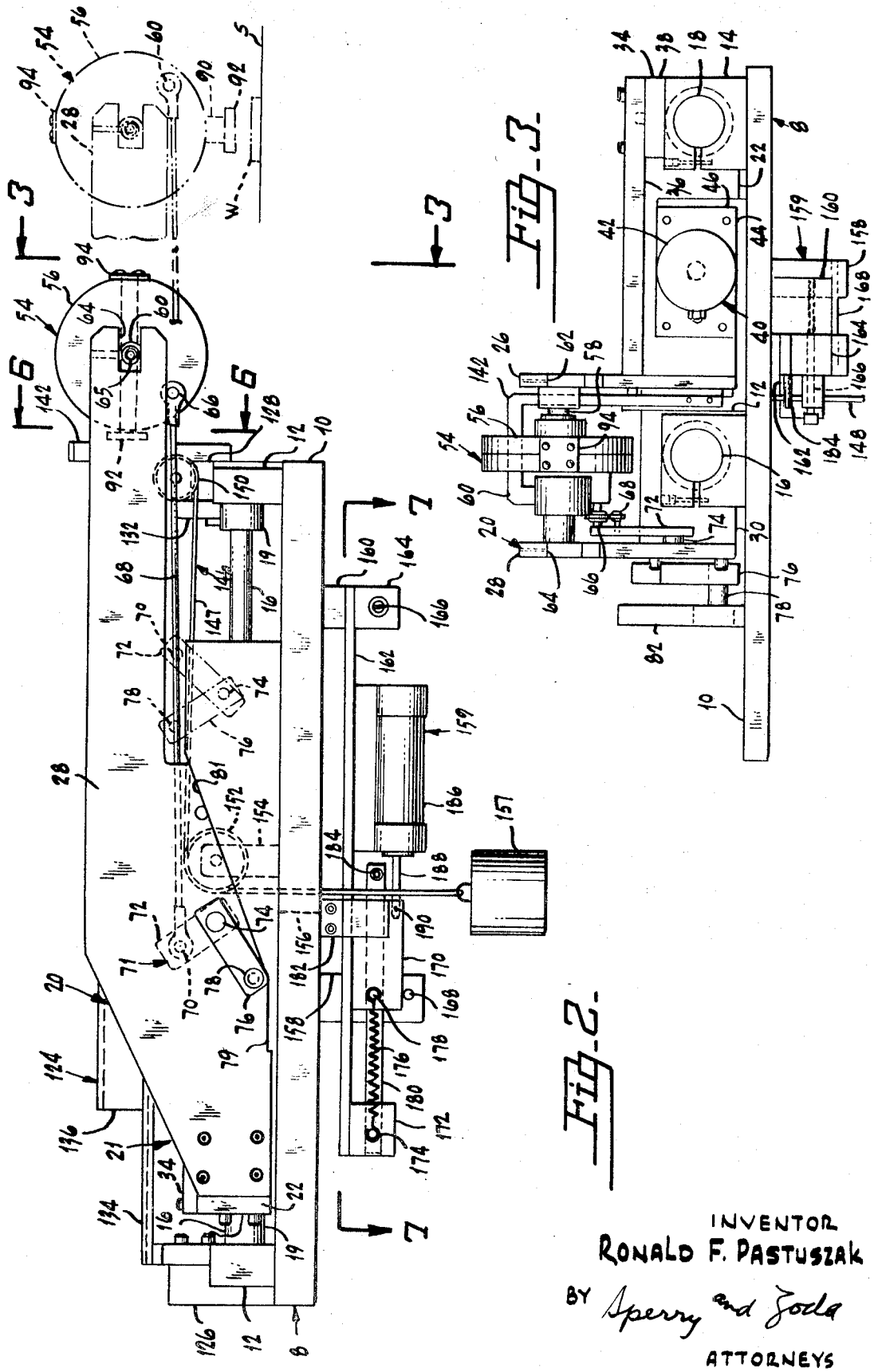

June 2, 1970 R. F. PASTUSZAK 3,515,310
WORKLOADER OF THE MAGAZINE TYPE
Filed March 20, 1968 4 Sheets-Sheet 3
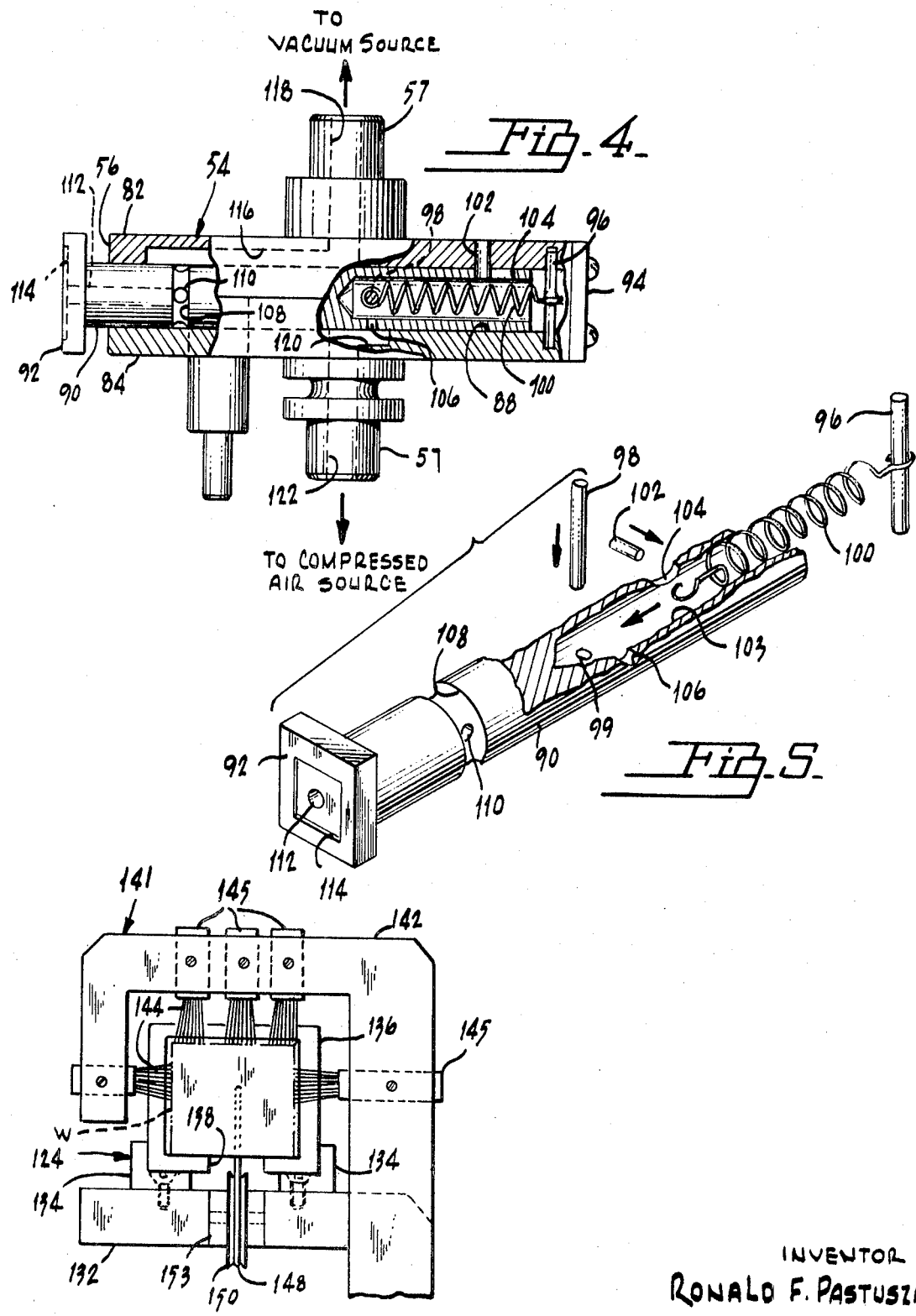
INVENTOR
RONALD F. PASTUSZAK
BY Sperry and Zoda
ATTORNEYS June 2, 1970 R. F. PASTUSZAK 3,515,310
WORKLOADER OF THE MAGAZINE TYPE
Filed March 20, 1968 4 Sheets-Sheet 4

INVENTOR
RONALD F. PASTUSZAK
BY *Sperry and Zoda*
ATTORNEYS

United States Patent Office 3,515,310
Patented June 2, 1970

3,515,310
WORKLOADER OF THE MAGAZINE TYPE
Ronald F. Pastuszak, Allentown, Pa., assignor to Precision Systems Company, Inc., Somerville, N.J., a corporation of New Jersey
Filed Mar. 20, 1968, Ser. No. 714,604
Int. Cl. B65g 59/04
U.S. Cl. 221—211                      6 Claims

ABSTRACT OF THE DISCLOSURE

A carriage carrying an oscillatory wheel reciprocates on a base adjacent a stationary, horizontal magazine within which workpieces are under controlled, intermittent pressure tending to move the same toward an open end of the magazine. In each oscillation cycle of the wheel, a nose thereon picks up a workpiece from the magazine and delivers it to a surface onto which the pieces are to be loaded in following order. During each such cycle, the wheel is bodily moved forwardly with the carriage, and is given its oscillatory motion by a mechanical motion-translating linkage connected between the wheel and base.

CROSS REFERENCE TO RELATED APPLICATION

The present application is related to my copending application, Ser. No. 664,785, filed Aug. 31, 1967, entitled Apparatus for Rapidly and Precisely Positioning a Succession of Small Workpieces, now Pat. No. 3,441,121 issued Apr. 29, 1969, in the sense that the present invention covers apparatus designed to deliver workpieces to a surface upon which they would be precisely positioned by means of the equipment shown in said copending application.

BACKGROUND OF THE INVENTION

Field of the invention

The present invention pertains to the field of art bearing upon the transfer of workpieces from a stack thereof or from a loaded magazine, onto a surface where they are to be located at spaced intervals for the performance of further work thereon. Such surface might be a conveyor belt, a dial on which the workpieces are to be assembled with other components, or the like. In particular, the apparatus constituting the invention has been designed to load ceramic substrates onto which microcircuits or other electrical components are to be printed. The invention is not, however, necessarily limited to this particular field, and it may be advantageously employed in the loading of any of various, usually small workpieces of like shape and size.

Description of the prior art

So far as is known, the prior art, particularly as regards the loading of ceramic substrates during the manufacture of microcircuits, has employed either manual loading procedures, vertical magazines, magazines with parts located side-by-side or end-to-end, or partitioned loading trays. Vertical magazines, however, have the difficulty in that the pressure on the lower most workpiece (generally the workpiece that is to be removed from the vertical stack) does not remain constant, and decreases as the total number of the workpieces is reduced during the steady depletion of the stack. This, in turn, often produces malfunction in the transfer mechanism whereby the workpieces are moved from the stack onto the delivery surface.

In the vertically stacked arrangements, the weight of workpieces against lower pieces in the stack tends to damage work (such as printing of circuits) previously applied to the surfaces of the workpieces.

Also, in vertically stacked arrangements heretofore employed, the adaptability of the equipment for conversion from one workpiece size or shape to another, is limited. Such apparatus, desirably, should be designed so as to be usable upon one occasion for handling workpieces of a particular size and shape, and on another occasion for handling workpieces of a particular size and shape, and on another occasion for handling workpieces of another size or shape, whereby to impart maximum versatility to the equipment. In the prior art, said versatility has not been achieved to the extent that is truly desirable.

Still further, the prior art equipment is not adapted for handling parts that are thin or cambered.

SUMMARY OF THE INVENTION

Summarized briefly, the invention includes a stationary support structure, on which a carriage is reciprocably mounted. A stationary, horizontal magazine holds a supply of workpieces, and within the magazine there is provided a follower, designed to exert pressure upon the supply of workpieces, which pressure will be uniform, within relatively narrow tolerancing, without regard to the number of workpieces remaining in the magazine. The equipment is particularly well suited for handling parts that are quite thin, cambered, or otherwise shaped in a manner that prevents feeding from a vertical stack or end-to-end.

On the carriage, an oscillatory wheel is mounted adjacent the discharge end of the magazine. A pickup piston within the wheel is timed to move back and forth, in such fashion that when moved in one direction, the piston will set up a vacuum in a nose of the piston, to pick up the next workpiece as the workpiece is pushed out of the magazine. The wheel then rotates simultaneously with being moved bodily forwardly from the magazine, and when it rotates to a predetermined delivery position, piston movement in the opposite direction causes the vacuum to be relieved, so as discharged the piece onto the delivery surface.

Timed with the oscillation of the wheel between its pickup and delivery positions is a means for relieving the pressure on the workpieces exerted by the magazine follower, at all times except when a workpiece is to be pushed out of the magazine and picked up by the wheel. This means utilizes a weighted cord connected to the follower, passing through a cord-pinching unit. This unit operates to pinch the cord and thus counter the effect of the weight on the cord, until such time as the pickup nose is ready to receive the next piece. At this time, the pinching unit momentarily releases the cord, so that the piece is pushed out of the magazine, after which the cord is immediately pinched once again. When the cord is pinched, it is elevated slightly at the same time, to relieve tension on the cord between the pinching location and the follower and thereby prevent accidental pressure on a workpiece tending to push the same out of the magazine at the wrong time.

BRIEF DESCRIPTION OF THE DRAWING

FIG. 2 is a side elevational view as seen from line 2—2 of FIG. 1;

FIG. 3 is a front elevational view of the apparatus as seen from line 3—3 of FIG. 2;

FIG. 4 is a top plan view of the oscillatory pickup wheel per se, partly in section;

FIG. 5 is an exploded perspective view of the pickup piston per se, portions being broken away;

FIG. 6 is a view across the front end of the magazine, taken substantially on line 6—6 of FIG. 2.

DESCRIPTION OF THE PREFERRED EMBODIMENT

Figure 1:
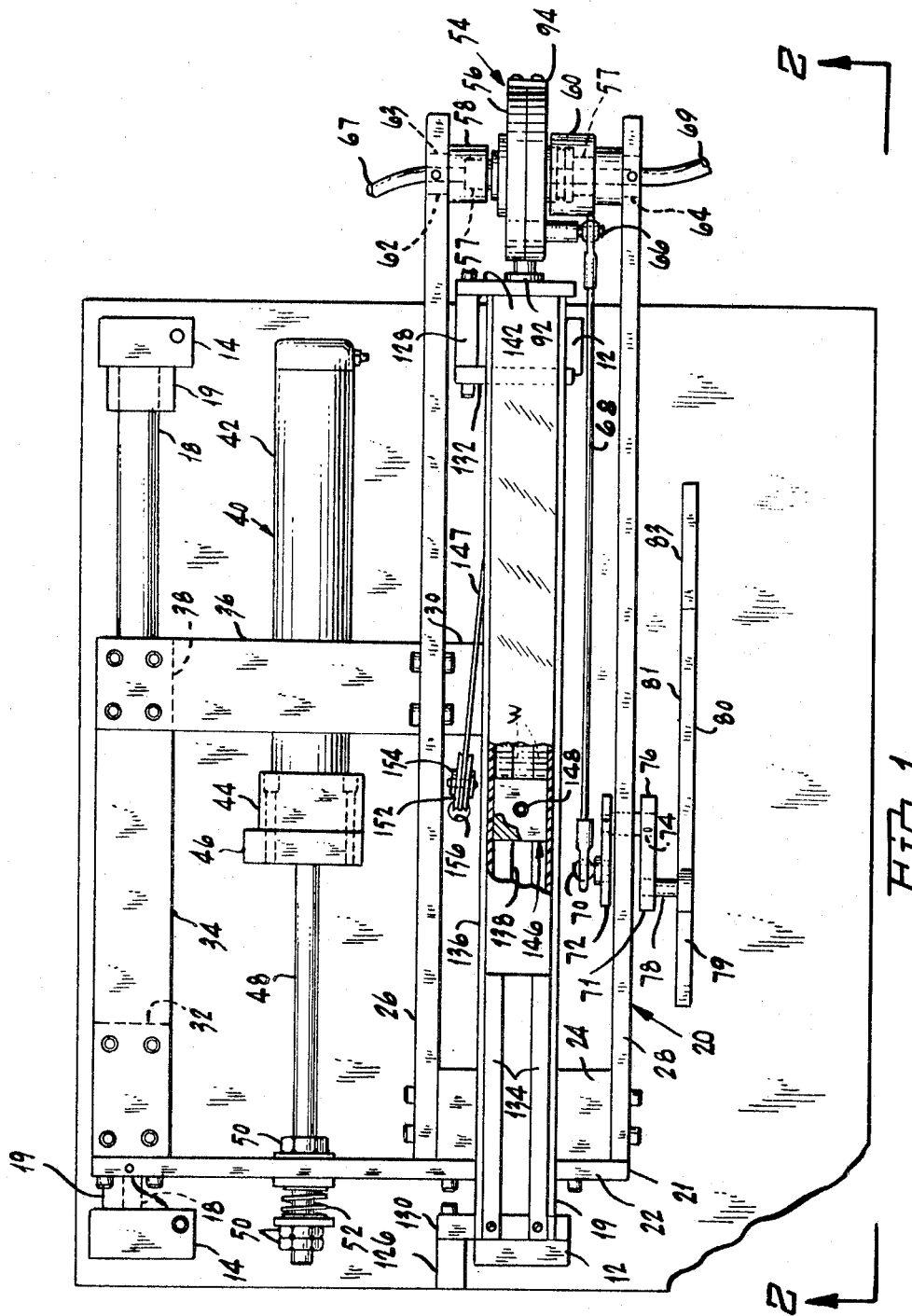
FIG. 1 is a top plan view of apparatus according to the present invention, portions being broken away.

A stationary support structure generally designated 8 includes a flat, rectangular base 10 on which are fixedly mounted an inner pair of coaxially aligned, split clamping blocks 12, and a similar, outer pair of clamping blocks 14. Guide rails 16, 18 are clamped at their ends in the blocks 12, 14 respectively, extending in a parallel, widely spaced relation upon the base in a fore-and-aft direction above the top surface of the base. Rubber bumper sleeves or cushions 19 receive the rail ends to provide shock-absorbent stops for a reciprocating carriage 21 of a workpiece transfer assembly generally designed 20. Carriage 21, shown in the drawings in its retracted position engaging the rear bumper sleeves 19, includes a transversely extending rear end plate 22 having openings at its respective ends receiving the rails 16, 18. Fixedly secured to the front surface of end plate 22, is a rear connecting block 24 having a bore slidably receiving rail 16. Secured fixedly to the ends of the transversely disposed block 24 are elongated, parallel, transversely aligned pickup wheel support arms 26, 28 the intermediate portions of which are connected to the opposite ends of a transversely extended front connecting block 30. Having a bore slidably receiving outer guide rail 18 is a block 32 affixed to the other end of rear end plate 22 of the carriage. The carriage further includes an elongated outer side plate 34 overlying rail 18, and secured at its rear end to block 32. Secured to the forward end of plate 34 is a transversely extending front end plate 36 of the carriage, extending to and affixed to the arm 26. Screws that connect plate 36 to plate 34 extend into a front guide block 38 having a bore slidably receiving rail 18.

The parts designated 21 through 38 together constitute the carriage of the workpiece transfer assembly 20, and as will be seen this carriage reciprocates upon the rails 16, 18, between a rear or retracted position shown in the drawing, and a forward position in which blocks 38, 30 engage against the front bumper sleeves 19. By adjustment, of course, the reciprocating stroke could be anything less than this maximum travel.

To reciprocate the carriage, an air cylinder assembly 40 mounted on base 10 includes an air cylinder 42 having a collar 44 secured to a support block 46 upstanding from and affixed to the base, to mount the air cylinder in a stationary, horizontal position. Working in the cylinder is a plunger 48, loosely positioned through an opening of the rear end plate 22. A hex nut 50 threaded on the plunger bears against the front surface of the plate 22. Bearing against the rear face of the plate 22 is a compression coil spring 52, the tension of which is adjustable by means of a pair of additional hex nuts 50 one of which constitutes a jam or lock nut. In this way, an adjustable, resiliently cushioned connection is provided between the plunger and the carriage. The air cylinder is arranged to retract and extend the plunger at predetermined, timed intervals to reciprocate the carriage correspondingly. No effort has been made to show the timing device controlling the plunger operation, since it is wholly conventional in various arts to operate air cylinder assemblies by timers designed to produce extension and retraction of the cylinder plungers at exactly determined points in time.

Also part of the workpiece transfer assembly 20 is a pickup wheel assembly generally designated 54, supported by and bodily movable with the carriage 21. Assembly 54 is carried by the front ends of arms 26, 28 and includes a wheel 56 (see FIGS. 1 and 4). This has at its opposite sides trunnions 57 rotatably bearing in stationary combined coupling and bearing sleeves 58, 60 respectively formed with air passages. The passages communicate with axial passages of the trunnions. Arms 26, 28 are respectively formed with forwardly opening, rectangular slots 62, 64. Fixedly engaged in the slots, by means of set screws, are the flattened ends 63, 65 of the sleeves 58, 60 respectively. Extending from and communicating with the passages of the sleeves 58, 60 are a vacuum line 67 and a compressed air line 69, respectively. A mechanical linkage is connected between wheel assembly 54 and the carriage 21, to oscillate the wheel responsive to reciprocation of the carriage.

The motion-translating connection includes a stepped link pin 66 on wheel 56 spaced radially from the wheel axis, and pivotally connected to an elongated connecting link or pitman 68. This extends rearwardly from the wheel and is pivotally connected at 70 to one end of a bell crank 71. Bell crank 71 is defined by arms 72, 76 disposed at approximate right angles to each other, at opposite sides of the pickup wheel support arm 28. Arms 72, 76 are conjointly rotatable about an axis defined by pin 74 journaled in an opening of arm 28 and keyed to or otherwise made rotatable with arms 72, 76.

Mounted on the distal end of arm 76 is a roller 78, normally disposed on the horizontal rear end 79 of a roller guide 80 having intermediate its ends an incline 81 emerging into an elevated, horizontal front end portion 83.

When the carriage moves forwardly from its retracted full-line to its advanced dotted line position shown in FIG. 2, roller 76, as it travels up the incline to the dotted line position of the bell crank shown in FIG. 2, causes the bell crank to turn approximately 90 degrees, as a result of which the arm 72 swings clockwise to shift the link 68 forwardly and thereby rotate wheel 56 counterclockwise in FIG. 2 from its full-line to its dotted line position, through 90 degrees.

Wheel 56 (FIG. 4) is made in two confronting halves 82, 84 joined by an annular series of connecting screws 86. Diametrically extending, confronting, semi-cylindrical recesses of the wheel halves form a diametric bore 88 in the wheel in which is reciprocable a piston 90 (FIGS. 4 and 5) one end of which projects beyond the wheel circumference and is formed with a pickup nose 92. Wheel 56 thus may appropriately be considered as a hollow housing or cylinder for the piston. A rearwardly opening, axial recess 93 of the piston is closed by a cover plate 94. Adjacent the cover plate, a pin 96 extends between and is engaged in the wheel halves 82, 84, and lies transversely across the bore 88.

Adjacent the inner end of recess 93 of the piston, a cross pin 98 is engaged at its opposite ends in diametrically opposed openings 99 formed in the wall of recess 93 of the piston. An extension coil spring 100 is hooked at its ends to pins 96, 98, and is tensioned to normally retract the piston.

Limiting the piston stroke in opposite directions is a pin 102 engaged in the wall of the wheel bore 88, and extending into a longitudinal guide slot 104 of the piston.

A compressed air inlet 106 communicates with axial recess 93 of the piston.

Forwardly of recess 93, piston 90 has a circumferential groove 108 communicating with a radial aperture 110 that opens into an axial passage 112 extending forwardly within the piston and opening upon a shallow recess 114 formed in the front, pickup surface of nose 92. Wheel half 82 has a radial vacuum passage 116 communicating between groove 108 and vacuum inlet passage 118 opening through trunion 57 of wheel half 82 into communication with the passage of the coupling 58. This, as previously noted, has a tubular connection 67 to a vacuum source, not shown.

Compressed air inlet 106 communicates with a short radial compressed air inlet passage 120 extending from connecting passage 122 which, through bearing 57, is in communication with a source of air under pressure, also not shown.

By a timing means, not shown, controlling the application of compressed air to the wheel assembly in timed relation to the operation of the air cylinder 40, an operating sequence is set up such that air under pressure is not applied to the piston 90, when the carrier is in its retracted position shown in full lines in FIG. 2. Under these circumstances, the wheel is in its full line, FIG. 2 position with the pickup nose projected rearwardly at a "nine o'clock" position. In these circumstances, there is a vacuum set up within passage 112, and hence at the pickup surface of nose 92. Piston 90 is retracted under the pulling force of the spring 100 at this time.

When the carriage advances, the wheel is rotated counterclockwise in FIG. 2 to the dotted line position, in which pickup nose 92 now faces downwardly above and in close proximity to surface S of a rotary assembly dial, conveyor belt, or the like. At this time, the timing means operates to direct air under pressure into recess 93, extending the piston toward surface S. By operation of a timing device controlling the application of the vacuum to the pickup nose, the vacuum is shut off when the pison is extended, causing the workpiece W to be released for gravitation to surface S.

The vacuum stays off until the carriage is retracted and the wheel returns to its pickup position. At this time, the air under pressure is cut off, retracting the piston and, as a result, setting up the vacuum in nose 92 once again.

The provision of separate timers for the vacuum and the air under pressure permits adjustment of each independently of the other.

A magazine assembly generally designed 124 is stationarily mounted between arms 26, 28, and includes rear and front support posts 126, 128 extending upwardly from base 10. Affixed to the posts are rear and front support arms 130, 132 respectively, and fixedly secured to said arms are parallel, elongated, horizontal support rails 134 (see FIGS. 1 and 6) of right-angular cross section supporting in stationary position a removable, elongated, open-ended magazine 136 of a cross section corresponding to the peripheral configuration and size of the workpieces W to be fed therefrom. In the present instance these are rectangular, but they could be circular or any other shape. If, for example, the apparatus is to be set up for feeding circular workpieces, rails 134 are readily removable, to be replaced by rails adapted to support a magazine of circular cross section, holding a supply of workpieces of circular outline.

In the bottom of the magazine, there is an end-to-end, longitudinal slot 138. A follower block 140 slides in the magazine, exerting pressure against the rear end of the supply of workpieces.

The front end of the magazine opens in close proximity to wheel 56, and yieldably restraining the forwardmost workpiece from movement through said front end is a retaining means generally designated 141, including a brush support of inverted J shape, secured to and extending upwardly above the front magazine rail support arm 132. Retaining brushes 144 extend inwardly from opposite sides of and from the top of the support 142, and project inwardly past the side and top walls of the magazine, to gently engage the side and top edges of at least the forwardmost workpiece. The extent to which the brushes project is variable, by adjustable positioning of the brush holders 145 within support 142.

A workpiece advancing mechanism generally designated 146 includes the follower block 140, a cord 148 connected to said follower block and extending within slot 138, and pulleys 150, 152 about which the cord is trained. Pulley 150 is mounted upon a pulley support 153 carried by the front rail support arm 132 (FIG. 6). Pulley 152 is disposed intermediate the ends of the magazine at one side thereof (FIG. 1), upon a pulley support 154 secured to and projecting upwardly from base 10, adjacent an opening 156 of the base through which the cord 148 extends below the base. At its lower end, the cord is connected to a weight 157 tending to exert a pull on the cord effective to cause follower 140 to in turn exert pressure against the supply of workpieces. Secured to the underside of base 10 are a cam block 158 and a support block 160 of a cord-pinching unit generally designated 159, constituting a component of the workpiece advancing mechanism 146. In said advancing mechanism, the cord-pinching unit serves the purpose of controlling the application of pressure exerted against the supply of workpieces by follower block 140, in such fashion as to cause the block to exert pressure against the pieces only once during each reciprocation of carriage 21, at the point during the carriage stroke when another workpiece is to be picked up by nose 92. Unit 159 includes an elongated, normally horizontal support plate 162, the front end of which is secured fixedly to a depending pivot block 164, having a horizontal transverse opening receiving pivot pin 166 projecting laterally from support block 160. Plate 162 thus pivots about a horizontal, transverse axis defined by pin 166.

Projecting laterally from block 158 is a cam pin 168, disposed in underlying relation to and in slidable contact with a cam block 170 having a slightly inclined bottom surface whereby any horizontal movement of said block 170 to the left in FIG. 2 will cause the same to be shifted upwardly by camming engagement of pin 168 against the inclined underside of the block 170.

The cam block 170 is in slidable contact, at its top, horizontal surface, with the underside of the plate 162.

Figure 7:
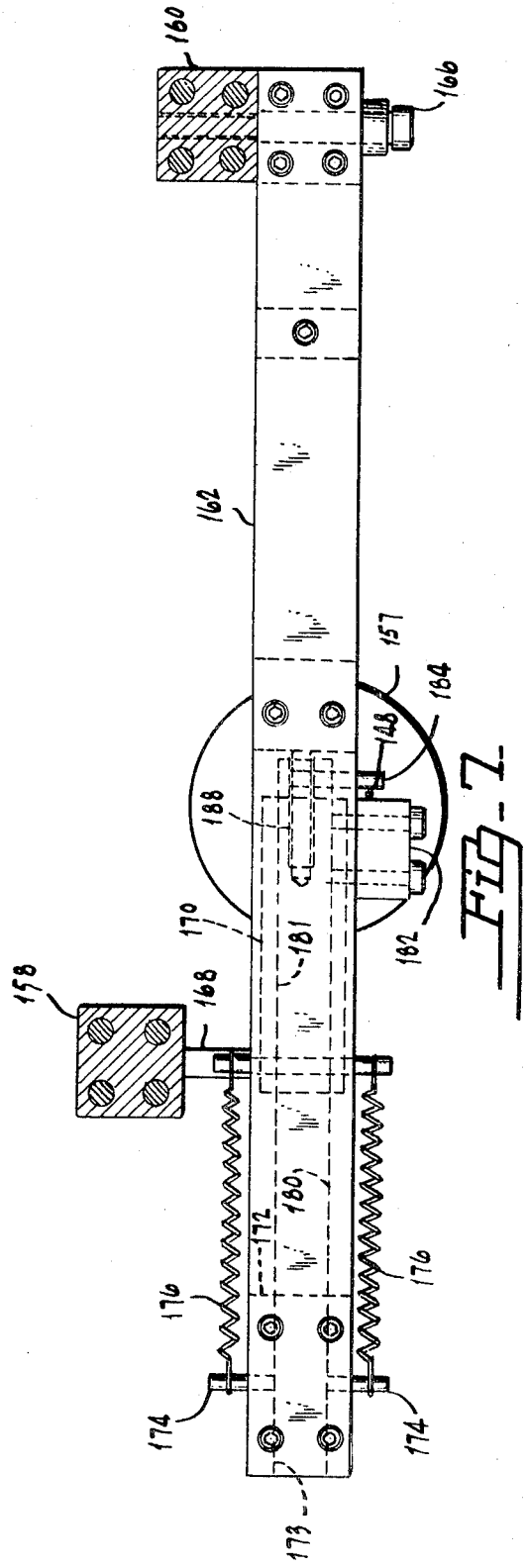
FIG. 7 is a horizontal sectional view on line 7—7 of FIG. 2, in which the cord-pinching assembly is shown in top plan.

Fixedly connected to and depending from the rear end of plate 162 is a block 172, having a longitudinal bore 173. Projecting laterally from the opposite sides of block 172 are pins 174, to which are connected one end of extension coil springs 176 which, as shown in FIG. 7, are connected at their other ends to the ends of a cross pin 178 extending transversely through block 170 and through an elongated guide bar 180. Bar 180 is thus pinned to block 170, said bar extending within a longitudinal bore 181 formed in the block 170, with the forward end of the bar projecting beyond the foward end of the block 170. Bar 180 extends rearwardly from block 170, sliding in bore 173.

Fixedly secured to one side of plate 162 is a pinching block 182, in closely spaced relation to a laterally projected cord-pinching pin 184 carried by the projecting front end of bar 180. Cord 148 extends between pin 184 and block 182.

Also mounted upon plate 162 is an air cylinder 186, having a plunger 188 extending into a forwardly opening recess of block 170. The plunger is loosely received within said recess, and is pivotally connected therein to the block, by pin 190 extending horizontally transversely across the plunger-receiving recess.

The operation of the air cylinder is timed, and is correlated with operation of the air cylinder 40.

When the air cylinder 186 is operated to retract plunger 188, block 170 is moved to the right in FIG. 2 by the plunger, against the restraint of springs 176. Since pinching pin 184 is carried by bar 180 pinned to and hence movable with block 170, said pin 184 is moved to the right in FIGS. 2 and 7, opening a space between pin 184 and pinching block 182, such that cord 148 is not pinched therebetween. Weight 157 is thus effective to exert a pull on the cord, whereby the follower block 140 exerts pressure against and moves forwardly the entire supply of workpieces, to cause the forwardmost workpiece to be located in the open front end of the magazine in pickup position. This is timed to occur with positioning of the nose 92 across the open front end of the magazine, whereby the workpiece to be picked up will be drawn out of the magazine past the brushes and will be engaged against the pickup nose, by reason of the vacuum set up within the nose.

The operation is so timed, as to cause only one workpieces to be picked up, after which the air cylinder 186 goes off, allowing springs 180 to contract and pull block 170 to the left in FIG. 2. This causes the pin 184 to move to the left in FIG. 2 with block 170, causing the cord 148 to be pinched between block 182 and pin 184.

As block 170 moves to the left in FIG. 2, cam pin 168 causes the block to ride upwardly, and the block in turn cams the plate 162 upwardly, about its pivot 166. The result is that not only is cord 148 pinched between block 182 and pin 184, but also, it is lifted slightly, to relieve tension between the pinching location and the follower block. This is desirable because a mere pinching of the cord without relieving the cord tension would still cause a residual pressure to be exerted by the follower 140 against the supply of workpieces, or would leave the several workpieces under compressive force, and this may be sufficient to overcome the restraint imposed upon the forwardmost workpiece by the retaining brushes.

It will be understood that the retaining brushes exert a restraint sufficient to prevent a workpiece from falling out of the front end of the magazine, but such restraint is intentionally not sufficient to prevent a workpiece from being pulled out of the magazine by the force of the vacuum in nose 92.

In use, it will be apparent that assuming the magazine to have a supply of workpieces W, and assuming the parts to be in their full line position of FIG. 2, operation of air cylinder 42 to retract plunger 48 is effective to shift the carriage 21 to the right in FIG. 2. A workpiece W will, preliminary to such advancement of the carriage, have been picked up by nose 92 and hence will be carried forwardly with the carriage.

As the carriage moves forwardly, the motion-translating connection is effective to rotate wheel 56 counterclockwise in FIG. 2, through 90 degrees to its dotted line position. This disposes nose 92 above the surface S onto which the workpiece is to be deposited. At this time, air under pressure is directed to the wheel, extending the piston. The vacuum is cut off, the workpiece drops, and the carriage begins to move through the return portion of its reciprocating stroke.

The pinching assembly, as will be understood, is so timed that when a workpiece is picked up and engaged by vacuum action against nose 92, air cylinder 186 goes off, allowing springs 180 to retract block 170 and hence cause the cord to be pinched and lifted. Thus, there is no pressure against the workpieces in the magazine tending to move the same forwardly until such time as the carriage has returned, the wheel is back in its full line, pickup position shown in FIG. 2, and the next piece is picked up. At this time, their cylinder 186 again operates to allow weight 157 to exert a pull on the cord, so that pressure exerted by follower block 140 is again effective to advance the workpieces. As previously described herein, when the wheel 56 is rotated clockwise from its dotted line to its full line position of FIG. 2, the supply of air under pressure to the wheel assembly is cut off, permitting spring 100 to contract, so as to retract the piston 90. A vacuum is set up in the pickup nose as the wheel returns to its pickup position.

I claim:

1. Apparatus for feeding workpieces comprising:
    (a) a support structure;
    (b) a magazine mounted upon said structure and adapted for holding a supply of workpieces, said magazine having an end through which said workpieces may be fed from the magazine in successively following order;
    (c) a workpiece transfer assembly carried by said structure including means adjacent said end of the magazine adapted for conveying each workpiece fed from the magazine through a predetermined angular path with respect to the magazine;
    (d) means for moving the workpiece conveying means through said angular distance; and
    (e) means operative, at timed intervals, to exert pressure on the workpieces tending to advance the supply of workpieces within the magazine to locate the forwardmost workpiece in position to move through said end of the magazine onto said conveying means when the conveying means is in position to pick up a workpiece preliminary to conveying the same through said angular path, said pressure-exerting means including a follower sliding in the magazine and bearing against the supply of workpieces, a cord connected to said follower, means normally pulling the cord in a direction effective to exert a pressure on the follower tending to move the same toward said end of the magazine, and means to relieve said pressure except when a workpiece is to be picked up by the conveying means.

2. Apparatus as in claim 1 wherein the pressure-relieving means includes a pair of opposed, relatively movable elements between which said cord extends, said elements pinching the cord between them when relatively moved toward each other so as to counter the effect of the cord-pulling means when the pressure on the follower is to be relieved.

3. Apparatus as in claim 2 wherein the pressure-relieving means further includes a cam element biasing the pinching elements bodily, when said elements are relatively moved toward each other, in a direction opposite to that in which the cord is normally pulled, so to relieve tension on the cord between the pinching location and the follower during the time when pressure on the follower is to be relieved.

4. Apparatus for feeding workpieces comprising:
    (a) a support structure;
    (b) a magazine thereon having a feed end through which workpieces may be discharged;
    (c) a carriage reciprocating on said structure;
    (d) workpiece conveying means oscillating on the carriage between a pickup position in which it removes a workpiece from said feed end and a delivery position in which it releases the conveyed workpieces; and
    (e) means for translating reciprocating movement of the carriage into oscillatory motion of said conveying means, comprising a mechanical linkage one end of which is connected to the conveying means and the other end of which, in response to the reciprocating movement of the carriage, is cammingly biased by the support structure in a direction to impart said oscillatory motion to the conveying means.

5. Apparatus as in claim 4 wherein the support structure includes an incline providing a cam surface, said linkage comprising a bell crank pivotally mounted on the carriage and having one end slidably engaged with the incline for rocking of the bell crank in response to movement of the carriage, and a pitman connected between the conveying means and the other end of the bell crank and linearly shiftable to oscillate the conveying means in response ot rocking of the bell crank.

6. Apparatus as in claim 4 wherein the conveying means includes a hollow housing mounted on the carriage for oscillating movement, said one end of the motion-translating linkage being connected to the housing, a piston sliding in the housing radially of the axis of oscillatory motion thereof, means normally retracting the piston into the housing, a connection to a source of air under pressure extending into the house rearwardly of the piston for extending the same when the conveying means is in said delivery position, and a pickup nose on the piston forwardly thereof having a connection to a source of vacuum under pressure, timed to create suction within the nose when the conveying means is in its pickup position and to relieve said suction to release the workpiece in the delivery position of the conveying means.

References Cited

UNITED STATES PATENTS

| | | | |
|---|---|---|---|
| 2,836,328 | 5/1958 | Kinney | 221—211 |
| 3,275,189 | 9/1966 | Goldsborough et al | 221—211 X |
| 3,338,192 | 8/1967 | King | 221—211 |

STANLEY H. TOLLBERG, Primary Examiner